United States Patent
Levy et al.

(10) Patent No.: US 7,043,442 B2
(45) Date of Patent: May 9, 2006

(54) DATA RETRIEVAL AND REPORT GENERATION SYSTEM FOR FOODSTUFFS

(75) Inventors: Menachem Levy, Brooklyn, NY (US); Yishai Hornbacher, Brooklyn, NY (US); Shayna Leah Hershfeld, Brooklyn, NY (US)

(73) Assignee: Kip Holding Inc., Brooklyn, NY (US)

( * ) Notice: Subject to any disclaimer, the term of this patent is extended or adjusted under 35 U.S.C. 154(b) by 0 days.

(21) Appl. No.: 10/416,719

(22) PCT Filed: Jan. 16, 2002

(86) PCT No.: PCT/US02/01265

§ 371 (c)(1),
(2), (4) Date: May 13, 2003

(87) PCT Pub. No.: WO02/080074

PCT Pub. Date: Oct. 10, 2002

(65) Prior Publication Data

US 2004/0098282 A1    May 20, 2004

Related U.S. Application Data

(60) Provisional application No. 60/277,488, filed on Mar. 20, 2001, provisional application No. 60/262,287, filed on Jan. 16, 2001.

(51) Int. Cl.
*G06F 17/60* (2006.01)

(52) U.S. Cl. .......................................................... 705/1
(58) Field of Classification Search ..................... 705/1
See application file for complete search history.

(56) References Cited

U.S. PATENT DOCUMENTS

| | | | |
|---|---|---|---|
| 5,231,566 A | 7/1993 | Blutinger | 364/401 |
| 5,478,990 A | 12/1995 | Montanari | |
| 6,375,077 B1 * | 4/2002 | Hankins | 235/462.45 |
| 2002/0026325 A1 | 2/2002 | Hirahara | 705/1 |
| 2002/0049643 A1 | 4/2002 | Church | |

OTHER PUBLICATIONS

Hersch, Valerie, "Is It Kosher?" Restaurant Business, v91, n13, pp:58-64, Sep. 1, 1992.*
O'Donnell, Claudia D, "Beyond ingredient functionality: supplier—processor relationships." Prepared Foods, v165, n6, p32, May 1996.*
www.ecFood.com, Retrieved from the Internet Archive WayBack Machine<www.archive.org>, date range: Jun. 20, 2000-Feb. 11, 2001.*

(Continued)

*Primary Examiner*—John G. Weiss
*Assistant Examiner*—Jonathan Ouellette
(74) *Attorney, Agent, or Firm*—Oppedahl & Olson LLP

(57) ABSTRACT

Unique identifiers are defined with respect to products (ingredients). Each identifier is indicative of a source of information regarding a certification of the respective ingredient with respect to a particular food quality. The information is stored in a computer database. Unique identifiers for ingredients are provided to a certification agency associated with the manufacturer, the certification agency associated with the manufacturer being non-identical to the certification agencies certifying the food qualities of the ingredients. Information is retrieved, by means of the identifiers, regarding the certification of the ingredients. The certification agency associated with the manufacturer is then able to certify the food quality regarding the product, based in part on the retrieved information.

27 Claims, 4 Drawing Sheets

OTHER PUBLICATIONS

LaBell, Fran, "Ensuring kosher quality." Prepared Foods, v164, n7, p66, Jun. 1995.*

Toops, Diane, "Supercharing the supply chain." Food Processing, v61, n7, p44, Jul. 2000.*

O'Donnell, Claudia D, "Kosher confusion: fighting to uphold the integrity of kosher seals, manufactures face frunstrating contradictions." Gorman's New Product News, v29, n4, p8, May 10, 1993.*

"Product developers tackle ingredient issues." Candy Industry, v164, n9, p44, Sep. 1999.*

Simmons, Bret L; White, Margaret A, "The registration between ISO 9000 and business performance: Does registration really matter?" Journal of Managerial Issues, v11n3, PP: 330-343, Fall 1999.*

Goffin, Keith; Szwejczewski, Marek; New, colin, "Managing suppiliers: when fewer can mean more," International Journal of Physical Distribution & Logistics Management, v27n7, PP; 422-436, 1997.*

Anderson, Shannon W; Daly, J Daniel; Johnson, Marilyn F, "Why firms seek ISO 9000 certification: Regulatory compliance or competitive advantage?" Production & Operations Management, v8n1, PP: 28-43, Spring 1999.*

Garelik, Rabi Levy, The Complex Task of Tracking Ingredients, Kosher Today Newspaper Archives, Published in: US, Not Valid Prior Art.

Rabbi Don Yoel Levy, Large and small kashrus organization, Organized koshur laboratories,, Published in: us, Not Valid Prior Art.

Tracking Back, Pure Organics Limited, Published in: US, Not Valid Prior Art.

Track, Organized Kashrus Laboratories, Published in: us, Not Valid Prior Art.

* cited by examiner

DATA RETRIEVAL AND REPORT GENERATION SYSTEM FOR FOODSTUFFS

This application claims priority from U.S. Provisional Application No. 60/262,287 filed Jan. 16, 2001, and from Provisional Application No. 60/277,488, filed Mar. 20, 2001, each of which is incorporated herein by reference.

The application relates generally to data retrieval and report generation systems, and relates more particularly to systems storing data about foodstuffs and their ingredients, for example systems intended to assist in permitting consumers to be informed of the kosher status of products.

BACKGROUND

As will be described herein, it is not easy to set up systems permitting sellers of food products to be able to provide information about the kosher status of foods to consumers. It is helpful to provide some background about known ways to try to provide such information.

"You shall not seethe a calf in its mother's milk." This statement in the Torah is one of several which represent the historical origins of definitions permitting an observant Jew to determine whether a food is kosher. An observant Jew will thus avoid mixing meat and milk in a meal, and will likewise avoid any food product in which meat and milk have been mixed. In a meal containing meat (a "meat meal") it is necessary to avoid products containing milk. In a meal containing milk (a "milk meal") it is necessary to avoid products containing meat. It will be appreciated that for manufactured products, labeling is extremely important. A consumer considering purchasing a product containing milk ingredients will want to know, with extremely high confidence, that the product does not contain meat ingredients, and vice versa. The consumer considering purchasing goods to be consumed during Passover will want to know, with similarly high confidence, that the product is free from leaven. It is particularly convenient to know which products are free from both milk and meat ingredients, since such products (called "pareve") may be freely included in a meat meal or a milk meal. The Torah also defines certain things (e.g. beef that has not been properly slaughtered and treated) which are not to be eaten at all.

Determining whether a product is kosher thus requires paying extremely close attention to the ingredients of which the product is made. In addition, it will be appreciated that there are several kosher qualities that are of interest, such as whether a product is pareve, or kosher for Passover, or "kosher dairy" (meaning that it is kosher but may not be mixed with meat). This, too, requires paying close attention to the ingredients of which the product is made. But these determinations also require paying close attention to the other ingredients used elsewhere in a manufacturing facility, for example for the manufacture of other products. Close attention must also be paid to the manner in which ingredients and finished products are packaged and transported.

In a simpler world, a consumer might personally have knowledge permitting the consumer to have high confidence in a seller's description of a product, perhaps being personally acquainted with the maker of the product and with the makers of the ingredients that went into the product. In today's globalized world, makers of products are distant from the purchasers of the products, and are also distant from the makers of the ingredients used to make the products. It is unrealistic for any single consumer to expect to be able to have personal knowledge permitting a high confidence as to the kosher qualities of products to be purchased.

Fortunately for the consumer who wishes to know the kosher status of particular products to be purchased, there are certification agencies which do the work of paying close attention to ingredient lists and ingredients and the many other things that permit a consumer to have a high level of confidence as to the kosher status. The certification agencies certify the status of particular products, and they permit the use of markings which consumers can recognize and use in making their product selections.

Let us suppose that a food manufacturer decides that it wants to sell and market a product as kosher. Such a decision is typically motivated by customer demand. For example, the manufacturer may have done market research which suggests that a product can be better marked if it is kosher. In practical terms a consumer who wishes to be confident that a product marked as kosher really is kosher will look for a marking indicating that a certification agency has certified the kosher status of the product.

Potential customers may well differ from one to the next in the kosher requirements they impose upon their product purchasing choices. As a related matter, certification agencies may differ from each other in the requirements they impose to certify a particular type of product as kosher. One potential customer may choose only to purchase products certified by a particular certification agency, while another may be willing to purchase products certified by any of several certification agencies.

A manufacturer of a kosher product necessarily needs to use kosher ingredients. A manufacturer of an ingredient who wishes to be able to sell the ingredient to a manufacturer of a kosher product will need to be able to provide assurance to its customer that the ingredient is kosher.

Many manufacturers have relationships with particular certification agencies. But a first step for a manufacturer that has not previously had products certified as kosher will be to contact a certification agency. A manufacturer whose interest is in selling ingredients to a customer manufacturer (who sell kosher products) may become acquainted with a certification agency because it certifies the customer's products. A manufacturer of consumer products that is interested in obtaining kosher certification for its products may become acquainted with a certification agency because it certifies the kosher status of one of the manufacturer's ingredients.

A certification agency will typically only certify products after a physical inspection of the manufacturing facility or facilities involved. The agency must necessarily keep track of certain information about the manufacturer, and must inspect the facilities at regular intervals to ascertain that the information is correct. Such information includes the product to be certified, the ingredients used to make the product, and the production methods used. In addition, it is necessary to know what other products and ingredients are used on the same equipment, and which facilities are used to make the products. It will be appreciated that this means keeping track of which ingredients are used in which product and the process of producing each product.

Such information is collected and evaluated. It is then made available to a field representative who can inspect the facility to determine that the information presented is accurate and that the facility is in compliance with the agency's requirements. Field representatives are generally hired by the agency to visit the manufacturers' facilities. The field representative may be a Rabbi (generally an independent contractor) who inspects facilities on behalf of a certification agency. This person is often referred to as a Mashgiach or the plural Mashgichim.

Ingredients must, of course, be approved as part of the approval process for a product. Such approval may be based on any of several factors. The most common factor is a kosher certificate provided by the supplier of the ingredient. The kosher certificate is issued by a certification agency for the ingredient. Importantly, it often happens that the certification agency certifying the kosher status of the ingredient is not the same as the certification agency certifying the kosher status of the product. Each certification agency will evaluate the ingredient based on its kosher certification and its suitability to that facility.

Other ways of evaluating an ingredient may include general knowledge that the type of ingredient does not pose a kosher problem. Depending on the certification agency, an ingredient may be evaluated based on knowledge from the package labeling or from other sources, without requiring a kosher certificate for the ingredient After a favorable evaluation the product will be certified to be kosher. The certification agency provides a letter (referred to herein as a kosher certificate) attesting to the product's kosher status. The certification agency may also give permission to the manufacturer to print the agency's symbol on the label.

Throughout the period of certification the certification agency must, of course, be kept informed about any changes or additions to ingredients, formulas and production methods that affect the certified products. In addition, it is routine to have requests to add new certified products from time to time.

The manufacturer and the certification agency will typically have a relationship that lasts a year and that is routinely renewed. Each kosher certificate has an expiration date, and issuance of a new kosher certificate to replace the expired one is tied to continued inspections and continued provision of information about the product or products by the manufacturer to the certification agency. A kosher certificate will thus typically have an expiration a year after it has been issued.

Consider, then, what happens if a kosher certification for a product is based, in part, on a kosher certificate (for an ingredient) issued by a certification agency that is not the same as the agency certifying the product. As a general matter it may be expected that the kosher certificate for the ingredient will have an expiration date that is not the same as the expiration date of the kosher certificate for the product Thus, it is necessary to obtain updated certificates for the ingredients as they expire.

It will also be appreciated that in food manufacturing processes, there can be many companies involved in many different ways. One company may manufacture nothing at all, simply purchasing a product from someone else and affixing its own label on the product. Another may outsource the manufacturing of its product by essentially renting equipment owned by another company. Still other companies manufacture products that are to be labeled by others. In addition, there are specialized parts of the food service industry, such as restaurants, caterers, hotels and bakeries. Such specialized businesses are typically kosher-certified in their entirety, rather than for specific products.

A particular certification agency may find itself certifying at any location along these chains of production. This may mean that the certification agency must certify other parts, or arrange for certification of other parts. For example, if a certification agency is certifying someone who does not manufacture, but who instead purchases products and relabels them, the agency must necessarily enter into some arrangement with the actual manufacturer to ensure that the product is kosher. As another example, if a certification agency certifies products that are sold to others and relabeled by them, the agency must necessarily retain control of its symbol for those who relabel the product.

Decertification issues also arise. If a product is decertified, the labeling and kosher certificates must of course be appropriately terminated. If an ingredient is decertified, this should necessarily lead to decertification of products using that ingredient.

It will thus be appreciated that several categories of entities interact with each other in connection with kosher certification. There are the certification agencies, the field representatives, and the customers, which in this context include manufacturers, ingredient suppliers, and others in the chain of production.

Many prior-art systems for certifying products as kosher, and for accomplishing the other tasks discussed above, have been in used for a very long time. Such systems are, however, very cumbersome. They rely upon passing physical items such as kosher certificates from one entity to another. A report from a field representative typically must be filed on paper. A request for an approval for an ingredient change may well take a long time to be processed. Obtaining kosher certification for a new product may also take a long time. The processing of paperwork is expensive. It is not easy to generate all of the reports that one or another of the entities mentioned above might wish to be able to generate.

U.S. Pat. No. 5,231,566 describes a method and apparatus for producing a catalog. Unfortunately, the described method and apparatus discard kosher-related information. That method and apparatus have a goal of increasing the chance that only one item number is assigned to a product, even if, for example, the composition of the specific item is changed. For example, the manufacture of Coca-Cola soda is generally the same throughout the year. Thus, this soda may be given a first UPC number. However, during the Passover season, the manufacturing ingredients and/or procedures of the soda differs. Thus, the Kosher for Passover soda may be given a second UPC number. The invention of U.S. Pat. No. 5,231,566 tries to ensures that both types of Coca-Cola soda will be assigned the same item number in the produced catalog. Such a catalog is of no help to a customer who wishes to be fully informed as to the kosher status of a product.

It would be extremely helpful if there could be provided a system which provided improvements in kind, not merely in degree, with respect to prior-art systems. Merely converting flow of physical paper to electronic communications would, of course, offer potential efficiencies. But it would be helpful to devise systems and apparatus which would do much more than merely convert paper flow to computer communications. For example, it would be helpful to devise systems and apparatus which would not only accommodate kosher certificates from different certification agencies but which would wholly eliminate aspects of prior-art systems that take time and lead to delays and inefficiencies.

SUMMARY OF THE INVENTION

Unique identifiers are defined with respect to products (ingredients). Each identifier is indicative of a source of information regarding a certification of the respective ingredient with respect to a particular food quality. The information is stored in a computer database. Unique identifiers for ingredients are provided to a certification agency associated with the manufacturer, the certification agency associated with the manufacturer being non-identical to the certification agencies certifying the food qualities of the ingredients. Information is retrieved, by means of the identifiers, regarding the certification of the ingredients. The certification agency associated with the manufacturer is then able to certify the food quality regarding the product, based in part on the retrieved information.

DETAILED DESCRIPTION

Figure 1:
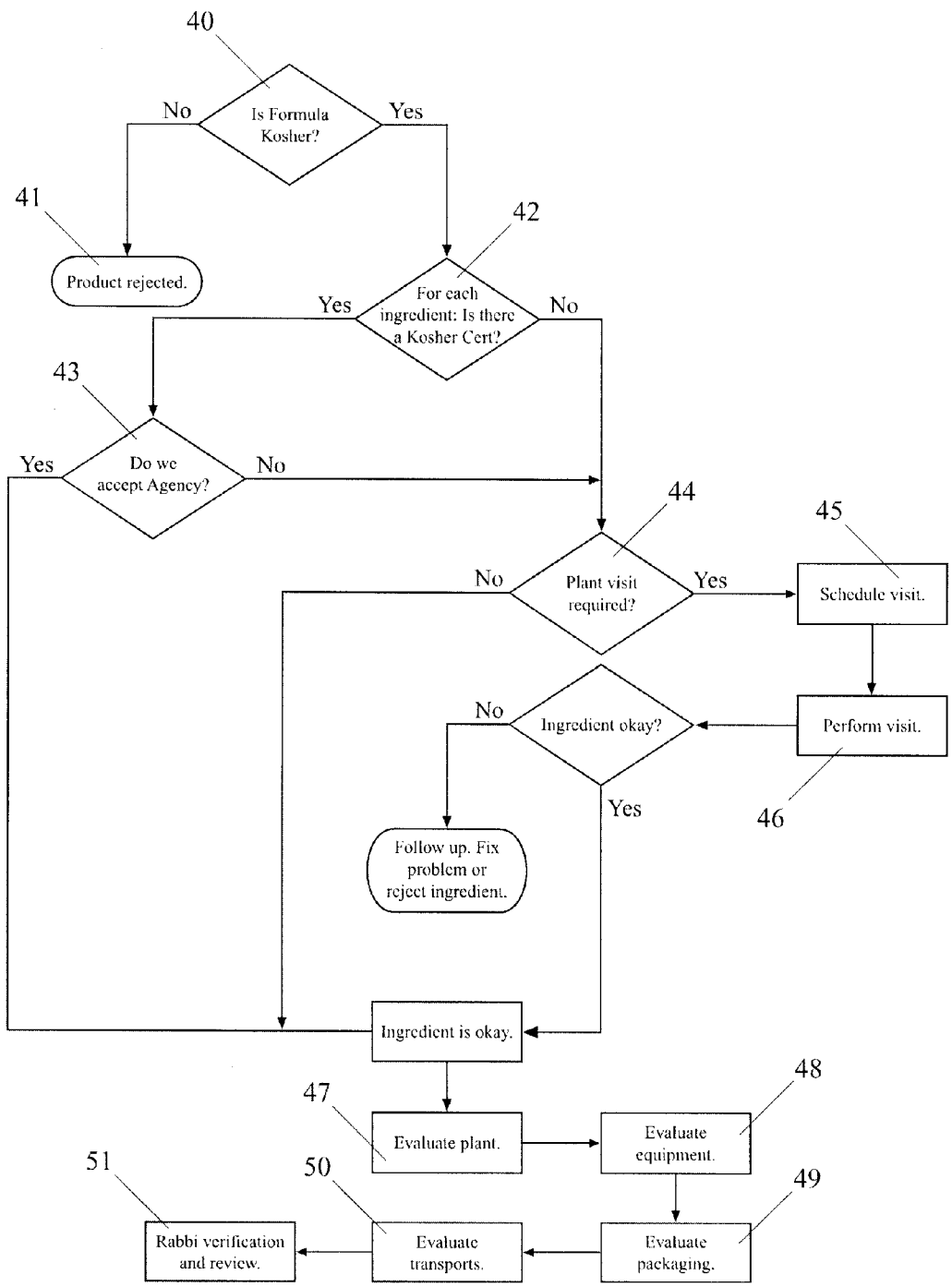
FIG. 1 is a flowchart showing new product approval using the system according to the invention.

The system and method according to the invention make use of unique identifiers called CIDs.

The CID is a unique identifier, preferably an alphanumeric code, which specifically identifies the product, current kosher status, packaging type (if specified), and certifying agency. Using the system, the CID is the key to identifying the product in question and avoiding much of the paperwork that would otherwise be involved with submitting kosher certificates. A user of the system, by having an ingredient linked to a CID, will be automatically updated about the status of the ingredient without having to request updated certificates. The CID may, optionally, relate to more than one size of package for the product.

The system according to the invention thus makes use of kosher certificates. As mentioned above, a kosher certificate is a letter from a certification agency, affirming that the product and/or facility are kosher certified. This letter is usually valid for a year. In the system according to the invention, it is necessary to store some or all of the following: the certificate ID, the expiration date, the issued date, the identity of the signer, one or more unique CIDs, and the Hebrew dates.

In the system according to the invention, to a particular certification agency, a kosher certificate may have the status of being "external," meaning the certificate was issued by a different agency. For such a certificate, it is necessary to store such information as the basic product information, full kosher status information, internal information which includes how the approval was done, the expiration date, and related information such as the issued date, the name of the signing rabbi, the list of ingredients, the identity of the customer who submitted the information and the date of submission.

In addition, a customer is able to quickly and immediately identify to a certifying agency which ingredient is being used. This permits quick and preferably automated response to a customer query for approval of the use of an ingredient.

In an exemplary embodiment, an object model is employed for the underlying database or databases. In this object model are defined:

Facility (generalization)
 a facility can be certified by a kosher certificate.
Manufacturing facility
 a manufacturing facility has an approved list of ingredients that can be used there.
 a manufacturing facility has an inventory. The inventory is the list of ingredients that are physically present at the facility. This is tracked when specific lot numbers of ingredients have an impact on the kosher status of products manufactured at the facility.
 a manufacturing facility can produce products.
 a manufacturing facility can contain various manufacturing equipment.
Product
 a product can be certified by a kosher certificate.
 a product can be produced using various equipment.
 a product is produced at a manufacturing facility.
 a product is produced using a formula. The formula contains a list of ingredients used in the production of the product.
Kosher certificate
 a kosher certificate can certify a product, a transport, or a facility.
Equipment
 equipment is used in the manufacture of a product.
 equipment is contained in a manufacturing facility.
 equipment has 0 or more cleansing processes that can be used to kosherize the equipment. The cleansing process may have to be overseen by a field representative.
Transport
 a transport is used to bring ingredients to a plant.
 a transport is cleaned by a cleaning facility.
 a transport has 0 or more cleansing processes that can be used to kosherize the transport. The cleansing process may have to be overseen by a field representative.

It is also helpful to distinguish between an ingredient list, a formula list, and a label ingredients list. An ingredient list is the collection of food items used in the manufacture of a product. Each food item on the ingredient list is associated with one item in the formula. However, each formula item can be associated with multiple food items. For example a formula may call for sugar, where the actual food item used is sugar made by one company or sugar made by another company. A formula list is the list of items that make up the formula for the product. This is different from the ingredient list as described above. Each formula list is associated with a formula. Each item on the formula list is associated with one or more items on the ingredient list. Each formula list item is associated with one or more label ingredients. For example, a formula may call for "artificial flavor" which is listed as an artificial color and as an artificial flavor on the ingredients label. Finally, label ingredients are the ingredients that are actually listed on the product label. Each label ingredient is associated with a formula. Each item on the label ingredients list is associated with an item on the formula list.

Several processes typify the activities undertaken using the system according to the invention. A typical event is the definition of a new product. The product name, company's product code, packaging type, and other information is entered into the system. A unique identifier (CID) is assigned from an appropriate identifier space. The product may well already have a kosher certificate from a certification agency, in which case information about the kosher status and the identity of the certification agency is entered into the system.

Another frequent event is that a manufacturer may wish to use a new ingredient in place of a previous ingredient. This means the formula for the product has changed. The manufacturer asks its certification agency for approval of the product with the new formula. In a paper-based system, this requires physically obtaining the kosher certificate for the proposed new ingredient, and reviewing it.

In the system according to the invention, the kosher certificate for the new ingredient is already in the system. The manufacturer need merely ask the supplier of the new ingredient to provide the CID for the ingredient (or may already have the CID from a previous selection process in which the ingredient was selected). The CID for the new ingredient is provided to the manufacturer's certification agency. In a rules-based way, the system determines whether the kosher status of the product is preserved.

From the above discussion it is clearly important to keep track of formulas. For a particular product, it is necessary for example to store the plant where the product is made, as well as storing the formula.

It should also be appreciated that in a preferred embodiment, there may be more than one CID for a product. This can happen because there may be differing transportation methods, different koshering procedures, presence of a Mashgiach during production, for formulas made in more than one plant, or for products made with different equipment. Thus on the one hand it is said that a CID is unique in the sense that each CID is different from any other, composed of different letters or numbers for example than any other. On the other hand, a product may have more than one CID.

It is also to be appreciated that a CID may be signed by more than one certification agency. Where an agency is certifying, say, a product, then a CD for an ingredient may be signed by more than one agency. This may permit the agency certifying the product to accept the certificate due to one signature even if it would not have accepted it based solely on the other signature.

Product approval using the system according to the invention will now be discussed in more detail, and is summarized in FIG. 1. Product approval is a sequential process. A starting question 40 is whether the formula is kosher. A formula which mixes ingredients that should not be mixed (e.g. meat and milk ingredients) does not require further inquiry but may be rejected 41 merely from review of the formula. A formula for which pareve status is desired, but which contains a non-pareve ingredient, may again be rejected merely from the review of the formula.

Assuming the formula is kosher, the ingredient list is inspected. For each ingredient, it is necessary to determine 42 whether the ingredient has a kosher certificate. If there is a kosher certificate, a decision 43 is made whether to accept the certifying agency for that type of ingredient. For example, one might accept a certificate from a particular certification agency for pareve ingredients but not for dairy ingredients.

If there is no certificate for an ingredient, then an evaluation 44 is done to determine whether a plant visit is required. If a visit is required, then a visit is scheduled 45 and performed 46.

When all ingredients have been evaluated, the plant itself is evaluated 47. This includes verifying the other ingredients used at the plant, and the other products manufactured at the plant, that could have an impact on the kosher status of the product to be certified.

Similarly, manufacturing equipment 48, packaging methods 49, and transports 50 used in the manufacture of the product to be certified are evaluated for their impact on the kosher status of the product. Finally, the process is reviewed 51 by a rabbi.

In the method according to the invention, the following steps typically occur. First and second unique identifiers are defined which are associated with respective at least first and second ingredients, each such identifier being indicative of a source of information regarding the certification of the respective ingredient, with the information stored in a computer database. The at least first and second unique identifiers are communicated to a certification agency associated with the manufacturer. It will often happen that the certification agency associated with the manufacturer is non-identical to the first certification agency and non-identical to the second certification agency. Information is retrieved, by means of the identifiers, regarding the certification of the ingredients. The certification agency then certifies the food quality regarding the product, based in part on the retrieved information.

Figure 2:
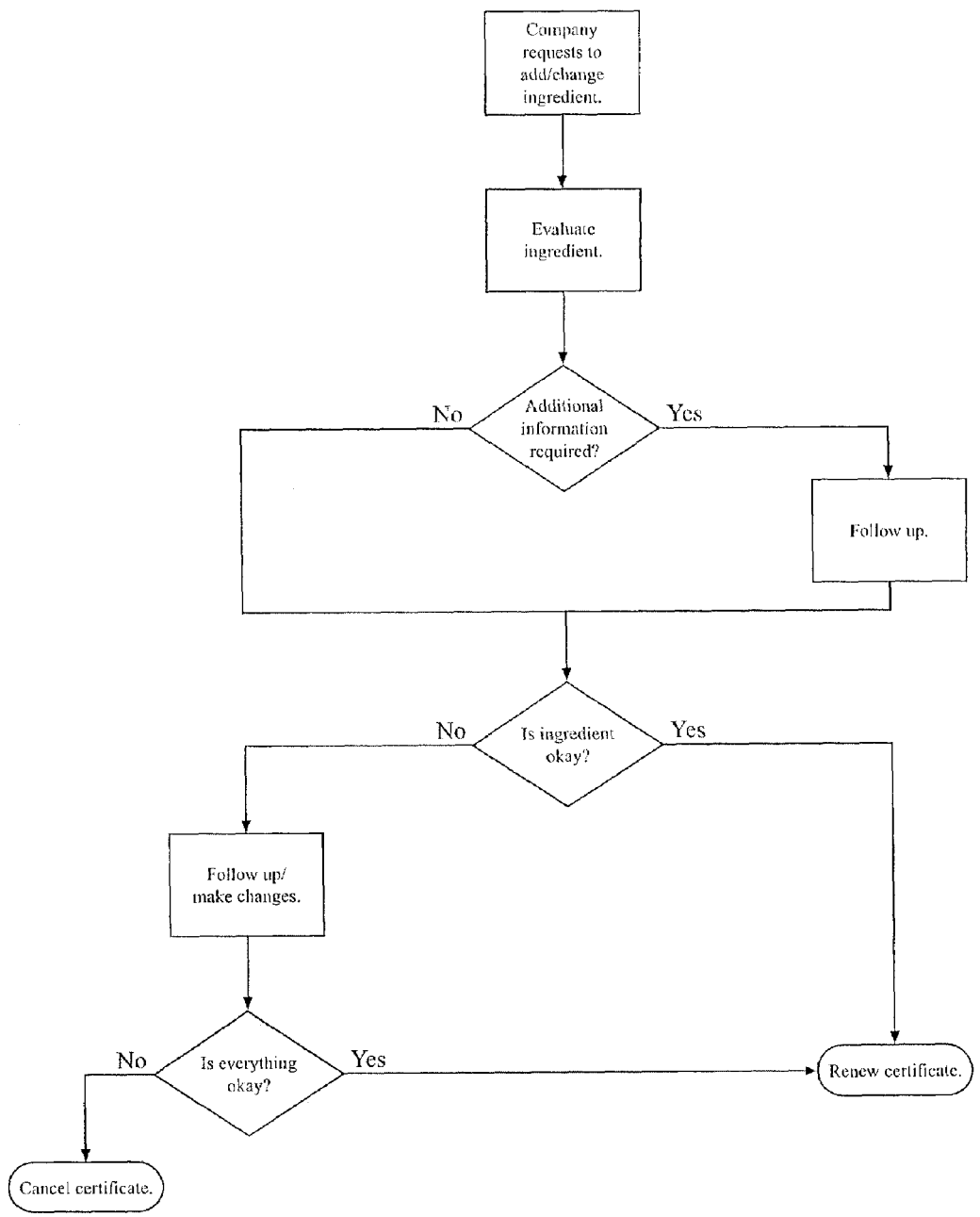
FIG. 2 is a flowchart showing product approval using the system according to the invention, where there has been an ingredient change or an added ingredient.

As mentioned above, another frequent event is that a manufacturer may wish to use a new ingredient in place of a previous ingredient. The method according to the invention is summarized in FIG. 2. The following steps typically occur. The unique identifier for the new ingredient is provided to a certification agency associated with the manufacturer. It will often happen that the certification agency associated with the manufacturer is non-identical to the certification agency that certified the ingredient. Information is retrieved, by means of the identifier, regarding the certification of the new ingredient. The certification agency for the product will then certify the food quality regarding the product, based in part on the retrieved information.

Figure 3:
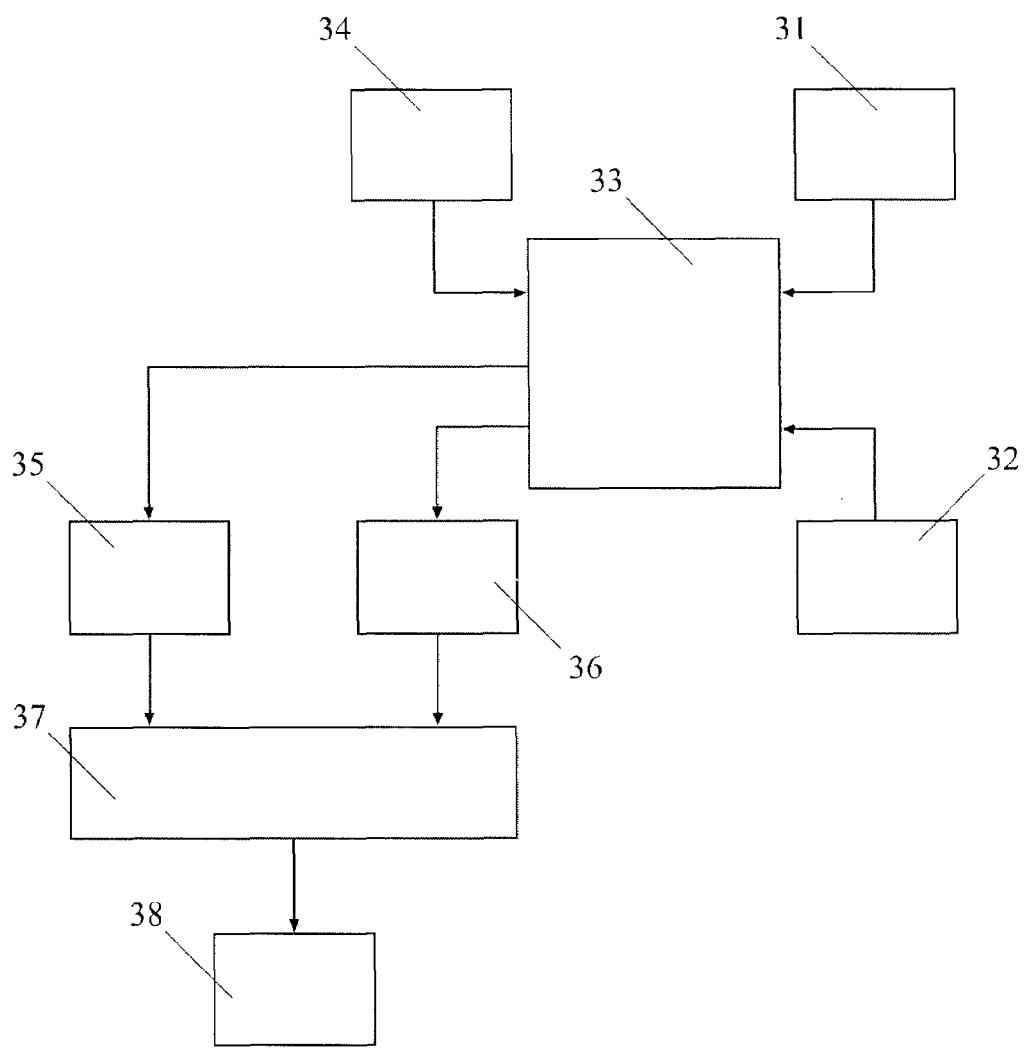
FIG. 3 is a dataflow diagram showing the flow of data according to the invention.

FIG. 3 shows data flow in an exemplary embodiment of the invention. A database 33 contains information about kosher certificates. This information comes from typical kosher certificates 31, 32. When there is a need to certify a new product, the ingredient list 34 is used. Each ingredient (or at least most of the ingredients) will have a CID, which is used to query the database 33. Certificate information about the ingredients is drawn from the database at 35, 36. (In this simple example it is assumed there are only two ingredients.) The information is processed, preferably in a rules-based way, at 37. The results may be a certification of the product, at 38. This certification is communicated to the manufacturer of the product and also is stored back into the database 33.

Another embodiment of the invention relates to kosher certification for a facility. A facility may receive, for example, only pareve ingredients. In such a case, it does not matter what formulas are used for products; any product made from any of the ingredients will automatically itself be pareve. It becomes a straightforward matter to certify a new product from such a facility without needing to know more than that it came from that facility. The same would apply with other status such as dairy, meat, or kosher for Passover.

Figure 4:
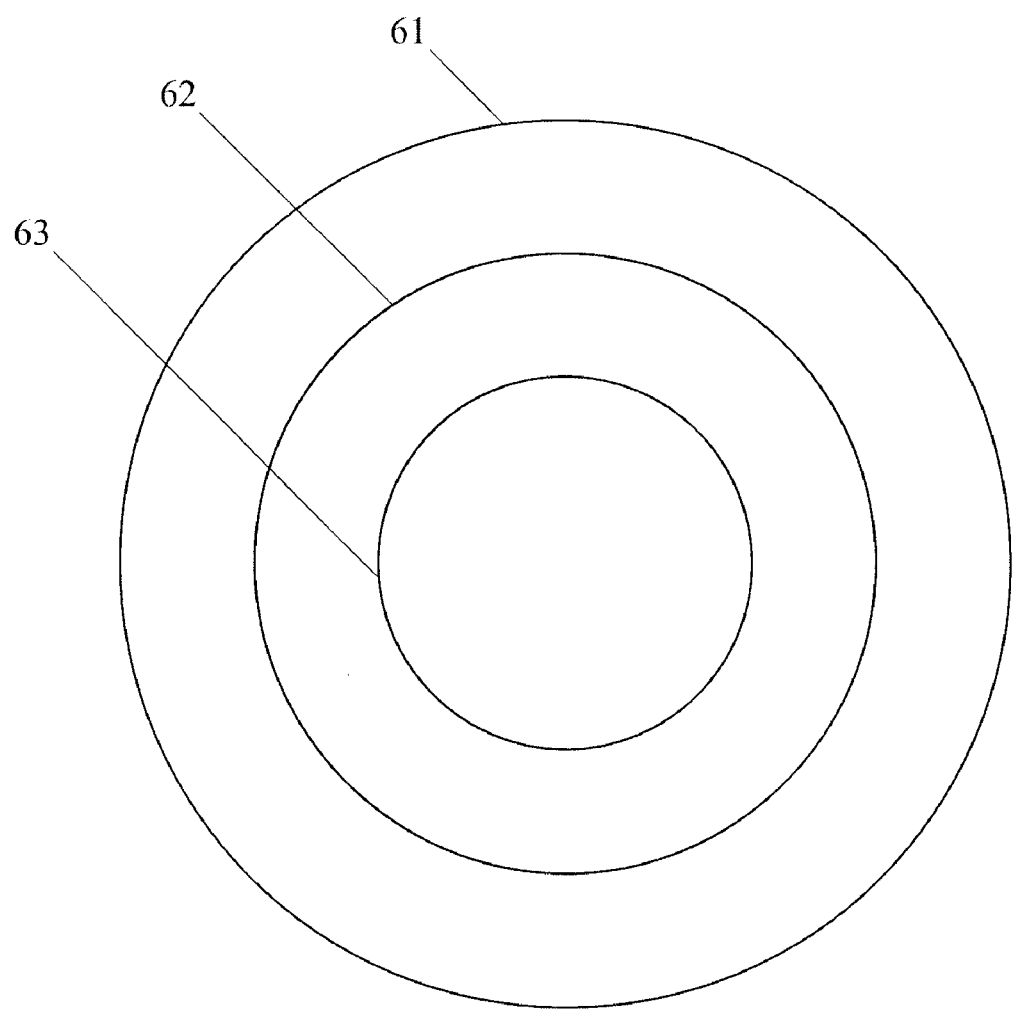
FIG. 4 shows broad and specific categories of certification.

FIG. 4 permits a conceptual appreciation of broad and specific types of acceptance of an ingredient by a certification agency. Circle 61 denotes the broad acceptance, by a certification agency, of an ingredient for use in general. Circle 62 denotes approval by a certification agency of an ingredient for use in a particular facility. The innermost circle 63 represents approval by a certification agency of an ingredient for use in a particular product.

It should be appreciated that the system according to the invention offers several heretofore unavailable benefits. For example, it is possible to globally approve two or more products that use a single ingredient upon approval of the ingredient. Likewise it is possible to globally disapprove two or more products that use a single ingredient upon decertification of the ingredient.

Importantly, as discussed above certification agencies differ from one to the next in the extent to which they will grant a certification to a product based in part on a certification previously granted by a different certification agency to an ingredient for that product. It will thus be appreciated that the system according to the invention provides great efficiencies by assisting and even automating a rules-based certification process for each certification agency.

Yet another benefit may be readily appreciated. Any manufacturer which desires to obtain ISO-9000 certification necessarily must accumulate enormous amounts of information regarding ingredients and processes used in manufacture. The information must be collated and kept up to date. A manufacturer who employs the system according to the invention will necessarily accumulate information about ingredients and processes. It is thus likely that the work required to employ the system according to the invention will provide all or nearly all of the accumulated documentation required for ISO-9000 certification.

The system according to the invention preferably keeps an automated audit trail for all certification activities, so that there will be no difficulty determining which person took each step and made each decision.

It should be appreciated that in this context a certificate ID (CID) is being described as a single unique identifier. One skilled in the art may, however, choose to break up the identifier into parts, but if the combination of parts is unique, this would still amount to a unique identifier and would not deviate from the invention. In the general situation, it may be termed a CID, and in the particular case of certifying kosher it may be termed a kosher ID or K-ID.

It should be appreciated that while the invention is described above in connection primarily with kosher certification, it is not narrowly limited thereto. Many of the issues that arise with kosher certification also present themselves with respect to halal requirements. As another example, some consumers are allergic to particular ingredients and thus have an interest in knowing which foods are free from such ingredients. Certifications might thus be established for absence of peanuts, for example, or absence of milk (for a lactose-intolerant consumer). As a general matter, then, the system according to the invention has applicability to many applications that are somewhat similar. Those skilled in the art will have no difficulty devising myriad obvious variations and improvements, all of which are intended to fall within the scope of the claims which follow.

The invention claimed is:

1. A method for certifying a kosher or halal food quality regarding a product from a manufacturer, the product composed of at least first and second ingredients from respective at least first and second suppliers, each of the at least first and second ingredients having been certified as to a kosher or halal food quality for the respective supplier by a respective at least first and second certification agencies, the method performed with respect to at least one computer database, each at least one computer database administered by a respective central manager, the method comprising the steps of:

submitting, by the supplier, kosher or halal food quality certification information regarding the at least first and second ingredients, to an at least one central manager;

defining, by the at least one central manager, at least first and second unique identifiers associated with respective at least first and second ingredients each from a respective at least first and second supplier, each such identifier indicative of a source of information regarding the kosher or halal certification of the respective ingredient from the respective supplier, the information stored in the at least one computer database, and maintained by the at least one central manager;

upon request by said manufacturer, communicating, by the at least one central manager, or by the said manufacturer, the at least first and second unique identifiers to a certification agency associated with the manufacturer, the certification agency associated with the manufacturer being non-identical to the first certification agency and being non-identical to the second certification agency;

retrieving, by the certification agency associated with the manufacturer, from the at least one database, by means of the unique identifiers, information regarding the kosher or halal certification of the ingredients;

certifying, by the certification agency associated with the manufacturer, the kosher or halal food quality regarding the product, based in part on the kosher or halal certification information retrieved from the at least one central manager; and communicating the kosher or halal food quality certification of the product to the manufacturer.

2. The method of claim 1 wherein the certified food quality is only kosher.

3. The method of claim 1 wherein the certified food quality is only halal.

4. A method for certifying a kosher or halal food quality regarding a product from a manufacturer in connection with a change in an ingredient, the product initially composed of ingredients including a first ingredient from a first supplier, the method practiced with respect to a second ingredient from a second supplier, each of the first and second ingredients having been certified as to a kosher or halal food quality for the respective supplier by a respective first and second certification agencies, the method performed with respect to at least one computer database, each at least one computer database administered by a respective central manager, the method comprising the steps of:

submitting, by the supplier, kosher or halal food quality certification information regarding the at least first and second ingredients, to an at least one central manager;

defining, by the at least one central manager, at least first and second unique identifiers associated with respective at least first and second ingredients each from a respective at least first and second supplier, each such identifier indicative of a source of information regarding the kosher or halal certification of the respective ingredient from the respective supplier, the information stored in the at least one computer database, and maintained by the at least one central manager;

upon request by said manufacturer, communicating, by the at least one central manager, or by the said manufacturer, the second unique identifier to a certification agency associated with the manufacturer, the certification agency associated with the manufacturer being non-identical to the second certification agency;

retrieving, by the certification agency associated with the manufacturer, from the at least one database, by means of the second identifier, information regarding the kosher or halal certification of the second ingredient;

certifying the kosher or halal food quality regarding the product, based in part on the kosher or halal certification information.

5. The method of claim 4 wherein the certification agency associated with the manufacturer is the same as the first certification agency.

6. The method of claim 4 wherein the certified food quality is only kosher.

7. The method of claim 4 wherein the certified food quality is only halal.

8. The method of claim 4 wherein the second ingredient is in addition to all of the previous ingredients.

9. The method of claim 4 wherein the second ingredient replaces the first ingredient.

10. A method for certifying a kosher or halal food quality regarding a product from a manufacturer, the product composed of at least first and second ingredients from respective at least first and second suppliers, each of the at least first and second ingredients having been certified as to a kosher or halal food quality for the respective supplier by a respective at least first and second certification agencies, the method performed with respect to at least one computer database, each at least one computer database administered by a respective central manager, the method comprising the steps of:
   submitting, by the supplier, kosher or halal food quality certification information regarding the at least first and second ingredients, to an at least one central manager;
   defining, by the at least one central manager, at least first and second unique identifiers associated with respective at least first and second ingredients each from a respective at least first and second supplier, each such identifier indicative of a source of information regarding the kosher or halal certification of the respective ingredient from the respective supplier, the information stored in the at least one computer database, and maintained by the at least one central manager;
   upon request by said manufacturer, communicating, by the at least one central manager, or by the said manufacturer, the at least first and second unique identifiers to a certification agency associated with the manufacturer, the certification agency associated with the manufacturer being non-identical to the first certification agency; retrieving, by means of the identifiers, information regarding the kosher or halal certification of the ingredients;
   certifying the kosher or halal food quality regarding the product, based in part on the kosher or halal certification information.

11. The method of claim 10 wherein the second certification agency is the same as the certification agency associated with the manufacturer.

12. The method of claim 10 wherein the certified food quality is only kosher.

13. The method of claim 10 wherein the certified food quality is only halal.

14. A method for certifying a kosher or halal food quality regarding a product from a manufacturer's facility in connection with a change in an ingredient, the facility initially receiving ingredients including a first ingredient from a first supplier, the method practiced with respect to a second ingredient from a second supplier, each of the first and second ingredients having been certified as to a kosher or halal food quality for the respective supplier by a respective first and second certification agencies, the method performed with respect to at least one computer database, each at least one computer database administered by a respective central manager, the method comprising the steps of:
   submitting, by the supplier, kosher or halal food quality certification information regarding the at least first and second ingredients, to an at least one central manager;
   defining, by the at least one central manager, at least first and second unique identifiers associated with respective at least first and second ingredients each from a respective at least first and second supplier, each such identifier indicative of a source of information regarding the kosher or halal certification of the respective ingredient from the respective supplier, the information stored in the at least one computer database, and maintained by the at least one central manager;
   upon request by said manufacturer, communicating, by the at least one central manager, or by the said manufacturer, the second unique identifier to a certification agency associated with the manufacturer, the certification agency associated with the manufacturer being non-identical to the second certification agency;
   retrieving, by the certification agency associated with the manufacturer, from the at least one database, by means of the second identifier, information regarding the kosher or halal certification of the second ingredient;
   certifying the kosher or halal food quality regarding a product from the facility, based in part on the kosher or halal certification information.

15. The method of claim 14 wherein the certification agency associated with the manufacturer is the same as the first certification agency.

16. The method of claim 14 wherein the certified food quality is only kosher.

17. The method of claim 14 wherein the certified food quality is only halal.

18. The method of claim 14 wherein the second ingredient is in addition to all of the previous ingredients.

19. The method of claim 14 wherein the second ingredient replaces the first ingredient.

20. A method for certifying a kosher or halal food quality regarding a product from a manufacturer's facility, the facility receiving at least first and second ingredients from respective at least first and second suppliers, each of the at least first and second ingredients having been certified as to a kosher or halal food quality for the respective supplier by a respective at least first and second certification agencies, the method performed with respect to at least one computer database, each at least one computer database administered by a respective central manager, the method comprising the steps of:
   submitting, by the supplier, kosher or halal food quality certification information regarding the at least first and second ingredients, to an at least one central manager;
   defining, by the at least one central manager, at least first and second unique identifiers associated with respective at least first and second ingredients each from a respective at least first and second supplier, each such identifier indicative of a source of information regarding the kosher or halal certification of the respective ingredient from the respective supplier, the information stored in the at least one computer database, and maintained by the at least one central manager;
   upon request by said manufacturer, communicating, by the at least one central manager, or by the said manufacturer, the at least first and second unique identifiers to a certification agency associated with the manufacturer, the certification agency associated with the manufacturer being non-identical to the first certification agency;
   retrieving, by the certification agency associated with the manuafacturer, from the at least one database, by means of the identifiers, information regarding the kosher or halal certification of the ingredients;
   certifying the kosher or halal food quality regarding the product, based in part on the kosher or halal certification information.

21. The method of claim 20 wherein the second certification agency is the same as the certification agency associated with the manufacturer.

22. The method of claim 20 wherein the certified food quality is only kosher.

23. The method of claim 20 wherein the certified food quality is only halal.

24. A method for renewing a certification of a kosher or halal food quality regarding a product from a manufacturer, the product composed of at least first and second ingredients from respective at least first and second suppliers, each of the at least first and second ingredients having been certified as to a kosher or halal food quality for the respective supplier by a respective at least first and second certification agencies, the method performed with respect to at least one computer database, each at least one computer database administered by a respective central manager, the method comprising the steps of:

submitting, by the supplier, kosher or halal food quality certification information regarding the at least first and second ingredients, to an at least one central manager;

defining, by the at least one central manager, at least first and second unique identifiers associated with respective at least first and second ingredients each from a respective at least first and second supplier, each such identifier indicative of a source of information regarding the kosher or halal certification of the respective ingredient from the respective supplier, the information stored in the at least one computer database, and maintained by the at least one central manager;

upon request by said manufacturer, communicating, by the at least one central manager, or by the said manufacturer, the at least first and second unique identifiers to a certification agency associated with the manufacturer, the certification agency associated with the manufacturer being non-identical to the first certification agency;

retrieving, by the certification agency associated with the manufacturer, from the at least one database, by means of the identifiers, information regarding the kosher or halal certification of the ingredients;

renewing certification of the kosher or halal food quality regarding the product, based in part on kosher or halal certification the information.

25. The method of claim 24 wherein the second certification agency is the same as the certification agency associated with the manufacturer.

26. The method of claim 24 wherein the certified food quality is only kosher.

27. The method of claim 24 wherein the certified food quality is only halal.

* * * * *